United States Patent
Kano et al.

(10) Patent No.: US 9,825,297 B2
(45) Date of Patent: Nov. 21, 2017

(54) NEGATIVE-ELECTRODE ACTIVE MATERIAL FOR SODIUM-ION SECONDARY BATTERY, METHOD FOR MANUFACTURING SAID NEGATIVE-ELECTRODE ACTIVE MATERIAL, AND SODIUM-ION SECONDARY BATTERY

(71) Applicant: PANASONIC INTELLECTUAL PROPERTY MANAGEMENT CO., LTD., Osaka (JP)

(72) Inventors: Akira Kano, Osaka (JP); Nobuhiko Hojo, Osaka (JP); Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 230 days.

(21) Appl. No.: 14/893,029

(22) PCT Filed: May 22, 2014

(86) PCT No.: PCT/JP2014/002698
§ 371 (c)(1),
(2) Date: Nov. 20, 2015

(87) PCT Pub. No.: WO2014/188723
PCT Pub. Date: Nov. 27, 2014

(65) Prior Publication Data
US 2016/0126550 A1    May 5, 2016

(30) Foreign Application Priority Data
May 22, 2013    (JP) .................................. 2013-107892

(51) Int. Cl.
*H01M 4/587* (2010.01)
*H01M 4/133* (2010.01)
(Continued)

(52) U.S. Cl.
CPC ............. *H01M 4/587* (2013.01); *C01B 31/02* (2013.01); *H01M 10/054* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2009/0253025 A1* 10/2009 Whitacre ............... H01G 11/06
429/50
2010/0261051 A1    10/2010 Okada et al.
(Continued)

FOREIGN PATENT DOCUMENTS

JP    2002-008653 A    1/2002
JP    2003-187806 A    7/2003
(Continued)

OTHER PUBLICATIONS

International Search Report issued in corresponding International Patent Application No. PCT/JP2014/002698, dated Jul. 1, 2014; with English translation.
(Continued)

*Primary Examiner* — Sarah A Slifka
(74) *Attorney, Agent, or Firm* — McDermott Will & Emery LLP

(57) ABSTRACT

A negative-electrode active material for a sodium-ion secondary battery contains a porous carbon material which has a plurality of open pores that extend through to the surface, a plurality of closed pores that do not extend through to the (Continued)

surface, and a solid made of carbon material. The distance between (002) planes of the solid portion is not less than 0.340 nm and not more than 0.410 nm. The plurality of closed pores account for a volume ratio of not less than 0% and not more than 10% with respect to a total volume of the plurality of open pores, the plurality of closed pores, and the solid portion. The plurality of open pores account for a volume ratio of not less than 0% and not more than 50% with respect to a total volume of the plurality of open pores, the plurality of closed pores, and the solid portion.

14 Claims, 2 Drawing Sheets

(51) Int. Cl.
 *H01M 10/054* (2010.01)
 *C01B 31/02* (2006.01)
 *H01M 4/02* (2006.01)

(56) References Cited

U.S. PATENT DOCUMENTS

| | | |
|---|---|---|
| 2011/0135990 A1 | 6/2011 | Yamamoto et al. |
| 2012/0015256 A1 | 1/2012 | Komaba et al. |
| 2013/0288127 A1 | 10/2013 | Matsumoto et al. |
| 2015/0162138 A1 | 6/2015 | Shodai |

FOREIGN PATENT DOCUMENTS

| | | |
|---|---|---|
| JP | 2004-095354 A | 3/2004 |
| JP | 2007-035588 A | 2/2007 |
| JP | 2009-129742 A | 6/2009 |
| JP | 2010-251283 A | 11/2010 |
| JP | 2011-519122 A | 6/2011 |
| JP | 2012-160437 A | 8/2012 |
| JP | 2012-169160 A | 9/2012 |
| JP | 5297565 B1 | 9/2013 |
| JP | 2014-036113 A | 2/2014 |
| JP | 5472514 B1 | 4/2014 |
| WO | 2009/069559 A1 | 6/2009 |
| WO | 2009/126525 A2 | 10/2009 |
| WO | 2010/013837 A1 | 2/2010 |
| WO | 2010/109889 A1 | 9/2010 |

OTHER PUBLICATIONS

International Search Report issued in corresponding International Patent Application No. PCT/JP2014/002686, dated Jul. 1, 2014; with English translation.

Co-pending U.S. Appl. No. 14/893,027, filed Nov. 20, 2015.

* cited by examiner

NEGATIVE-ELECTRODE ACTIVE MATERIAL FOR SODIUM-ION SECONDARY BATTERY, METHOD FOR MANUFACTURING SAID NEGATIVE-ELECTRODE ACTIVE MATERIAL, AND SODIUM-ION SECONDARY BATTERY

RELATED APPLICATIONS

This application is the U.S. National Phase under 35 U.S.C. §371 of International Patent Application No. PCT/JP2014/002698, filed on May 22, 2014, which in turn claims the benefit of Japanese Application No. 2013-107892, filed on May 22, 2013, the disclosures of which Applications are incorporated by reference herein.

TECHNICAL FIELD

The present application relates to a negative-electrode active material for a sodium-ion secondary battery, a method of producing the same, and a sodium-ion secondary battery.

BACKGROUND ART

In recent years, there has been increasing demands for secondary batteries as power sources for transportation apparatuses such as electric vehicles, hybrid vehicles and plug-in hybrid vehicles, and also for domestic and commercial large-sized power storage devices. As such power sources, lithium secondary batteries are widely used. In a lithium secondary battery, lithium ions are used as a charge carrier. However, lithium is a rare metal, thus presenting the problems of expensiveness and scarce yield.

As an alternative secondary battery, sodium-ion secondary batteries are under study. In a sodium-ion secondary battery, sodium ions are used as a charge carrier. As compared to lithium, sodium is abundant and is inexpensively available, and thus is drawing attention for a secondary battery that is low-cost and is capable of being implemented in large size. However, there has been conventional wisdom that, even if a material that is deemed usable as a negative-electrode active material in a lithium secondary battery (e.g., carbon materials of highly-graphitized structure, such as graphite) is straightforwardly used as a negative-electrode active material in a sodium-ion secondary battery, it is very difficult to realize a sodium-ion secondary battery having adequate performance (see Patent Document 1). Therefore, in order to realize practical applications of sodium-ion secondary batteries, positive- and negative-electrode materials, and especially a high-capacity negative-electrode material, are being desired and developed.

For example, Patent Document 1 proposes using a carbon material in amorphous glass form as a negative-electrode active material of a sodium-ion secondary battery. This is reported to provide a discharge capacity density per unit weight of 265 mAh/g at the most.

On the other hand, Patent Document 2 describes use of hard carbon as a negative-electrode active material of a sodium-ion secondary battery in which an anhydrous electrolytic solution containing a certain electrolytic-solution additive is used. This is reported to provide a discharge capacity density per unit weight of about 250 mAh/g at the most.

CITATION LIST

Patent Literature

[Patent Document 1] International Publication No. 2009/069559

[Patent Document 2] International Publication No. 2010/109889

SUMMARY OF INVENTION

Technical Problem

It has been desired in conventional sodium-ion secondary batteries to have a negative-electrode active material with a higher discharge capacity per unit volume.

One non-limiting, and exemplary embodiment of the present application provides: a negative-electrode active material for a sodium-ion secondary battery with an increased discharge capacity per unit volume; a method of producing the same; and a sodium-ion secondary battery incorporating the same.

Solution to Problem

In order to solve the aforementioned problems, one implementation of the present invention encompasses a negative-electrode active material for a sodium-ion secondary battery, comprising a porous carbon material having a plurality of open pores that extend through to a surface, a plurality of closed pores that do not extend through to the surface, and a solid portion made of carbon material, wherein, a distance between (002) planes of the solid portion is not less than 0.340 nm and not more than 0.410 nm; the plurality of closed pores account for a volume ratio of not less than 0% and not more than 10% with respect to a total volume of the plurality of open pores, the plurality of closed pores, and the solid portion; and the plurality of open pores account for a volume ratio of not less than 0% and not more than 50% with respect to a total volume of the plurality of open pores, the plurality of closed pores, and the solid portion.

Advantageous Effects of Invention

According to one implementation of the present invention, a negative-electrode active material for a sodium-ion secondary battery with a large capacity per unit volume is provided. Moreover, a sodium-ion secondary battery with a high capacity can be realized.

DESCRIPTION OF EMBODIMENTS

Figure 1:
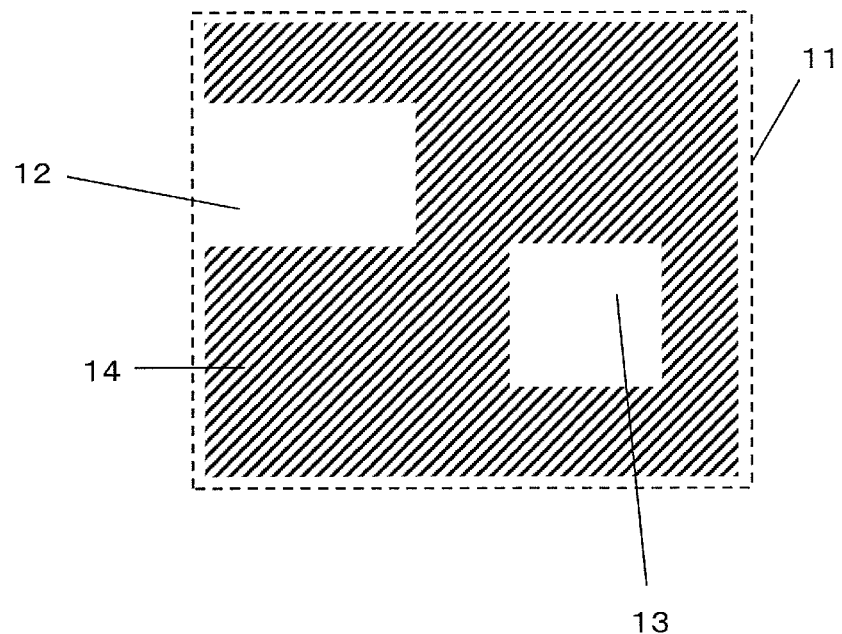
FIG. 1 A cross-sectional view showing a negative-electrode active material for a sodium-ion secondary battery according to an illustrative embodiment.

The inventors have investigated in the techniques disclosed in Patent Document 1 and Patent Document 2. In Patent Documents 1 and 2, glassy carbon and hard carbon as negative-electrode active materials for use in sodium-ion secondary batteries have the problems of low charge/discharge capacity density per volume. In particular, the hard carbon described in Patent Document 2 has an apparent density as small as 2 g/cc or less, and thus a sufficient discharge capacity per unit volume cannot be obtained.

Although Patent Documents 1 and 2 illustrate glassy carbon and hard carbon to be usable as negative-electrode active materials in sodium-ion secondary batteries, they fail to more specifically disclose what sorts of carbon structure of glassy carbon and hard carbon affect the charge-discharge capacity of sodium.

The inventors have paid attention to carbon materials as negative-electrode active materials for a sodium-ion secondary battery, and conducted a structural analysis for various carbon materials and studied reactivity of such carbon materials with sodium ions. As a result, it has been found that carbon materials of specific structures exhibit greater capacity densities per volume than conventional, as negative-electrode active materials for a sodium-ion secondary battery.

One implementation of the present invention is as follows, in outline.

A negative-electrode active material for a sodium-ion secondary battery according to one implementation of the present invention comprises a porous carbon material having a plurality of open pores that extend through to a surface, a plurality of closed pores that do not extend through to the surface, and a solid portion made of carbon material, wherein, a distance between (002) planes of the solid portion is not less than 0.340 nm and not more than 0.410 nm; the plurality of closed pores account for a volume ratio of not less than 0% and not more than 10% with respect to a total volume of the plurality of open pores, the plurality of closed pores, and the solid portion; and the plurality of open pores account for a volume ratio of not less than 0% and not more than 50% with respect to a total volume of the plurality of open pores, the plurality of closed pores, and the solid portion.

The distance between (002) planes of the solid portion is 0.36 nm or more, for example.

The plurality of open pores account for a volume ratio of 20% or less with respect to a total volume of the plurality of open pores, the plurality of closed pores, and the solid portion, for example.

A sodium-ion secondary battery according to one implementation of the present invention comprises: a negative electrode containing any of the above negative-electrode active materials; a positive electrode containing a positive-electrode active material capable of occlusion and release of sodium ions; and an electrolyte containing sodium ions.

A method of producing a negative-electrode active material for a sodium-ion secondary battery according to one implementation of the present invention comprises: a step of providing an organic material or a porous carbon material to serve as a carbon source; and a step of subjecting the organic material or porous carbon material to a heat treatment in an inert atmosphere to obtain a porous carbon material, wherein, the porous carbon material has a plurality of open pores that extend through to a surface, a plurality of closed pores that do not extend through to the surface, and a solid portion made of carbon material; a distance between (002) planes of carbon in at least a part of the solid portion is not less than 0.340 nm and not more than 0.410 nm; the plurality of closed pores account for a volume ratio of not less than 0% and not more than 10% with respect to a total volume of the plurality of open pores, the plurality of closed pores, and the solid portion; and the plurality of open pores account for a volume ratio of not less than 0% and not more than 50% with respect to a total volume of the plurality of open pores, the plurality of closed pores, and the solid portion.

The organic material is a cellulose-type resin, for example. The heat treatment temperature may be not less than 1100° C. and not more than 1300° C., for example.

The organic material is a phenol-type resin, for example. The heat treatment temperature may be not less than 1000° C. and not more than 1300° C., for example.

The organic material is phenolphthalein, for example. The heat treatment temperature may be not less than 1000° C. and not more than 1300° C., for example.

The porous carbon material is an activated carbon material, for example. The heat treatment temperature may be not less than 1600° C. and not more than 2500° C., for example.

(Embodiments)

Hereinafter, with reference to the drawings, an embodiment of a negative-electrode active material for a sodium-ion secondary battery according to the present invention will be described.

FIG. 1 is a schematic cross-sectional view illustrating a construction for the negative-electrode active material for a sodium-ion secondary battery according to the present embodiment.

The negative-electrode active material for a sodium-ion secondary battery according to the present embodiment contains a porous carbon material. The porous carbon material 10 has a plurality of open pores 12 that extend through to a surface 11 of the porous carbon material 10, a plurality of closed pores 13 that do not extend through to the surface 11, and a solid portion 14. FIG. 1 schematically shows one open pore 12 and one closed pore 13.

The porous carbon material 10 may be of various shapes so long as it possess the aforementioned structure having the open pores 12, the closed pores 13, and the solid portion 14, and may be of various shapes that are generally usable in active materials for a sodium-ion secondary battery. Specifically, the porous carbon material 10 may be of granular shape, flake shape, or thin film shape. In the case where the porous carbon material 10 is of granular shape, the average grain size thereof is e.g. not less than 0.01 μm and not more than 100 μm, and preferably not less than 1 μm and not more than 50 μm. When the average grain size is smaller than 1 μm, there is high surface activity, possibly resulting in a difficulty of handling. On the other hand, when it is greater than 50 μm, there is a possibility that the negative-electrode active material may have a slow rate of reaction.

Moreover, the negative-electrode active material for a sodium-ion secondary battery may mainly contain the porous carbon material, while also containing other negative-electrode active materials, additives, and the like. "Mainly" means inclusion at a rate of 50 weight % or more with respect to the whole. Preferably, the negative-electrode active material for a sodium-ion secondary battery contains the porous carbon material at a rate of 70 weight % or more, with respect to the whole.

The solid portion 14 is composed of carbon material. As used herein, a carbon material may be any of various substances that mainly contain carbon alone, with a structure that is based on carbon-carbon bonds. As derived from the method of producing the carbon material, small amounts of other elements such as hydrogen and nitrogen may be contained in addition to carbon, and, within the entire carbon material, there may be a portion(s) that locally contains an element(s) other than carbon.

In the present embodiment, in the carbon material composing at least a part of the solid portion 14, the distance between (002) planes of the carbon backbone that is formed by $sp_2$ hybrid orbitals is 0.340 nm or more. Moreover, the closed pores 13 account for a volume ratio of 10% or less, and the open pore ratio is 50% or less. As a result of this, the negative-electrode active material for a sodium-ion secondary battery according to the present embodiment has a large charge-discharge capacity per unit volume.

According to a detailed study by the inventors, in the porous carbon material, the sites which function as sites of sodium occlusion and release are considered to be the solid portion 14 and the closed pores 13 that do not extend through to the surface 11. That is: during charge, sodium becomes occluded in the interior of the solid portion 14 and the closed pores 13; and during discharge, the occluded sodium is released to the exterior.

It has been found preferable that, in order to ensure a sufficient amount of sodium to be occluded or released at the solid portion 14, the distance between (002) planes of the solid portion 14 is 0.340 nm or more, and is equal to or less than 0.410 nm, which is the maximum value of distance between (002) planes in commonly-used amorphous carbon materials.

Preferably, the closed pores 13 account for a volume ratio of 10% with respect to the total volume of open pores 12, closed pores 13, and solid portion 14. As described above, since sodium is occluded in the closed pores 13 and the solid portion 14 of the porous carbon material, any increase in their volume will result in an increase in the capacity of the porous carbon material. However, in order to obtain a negative-electrode active material with a large capacity density per volume, the solid portion 14 is far more important than the closed pores 13 that do not extend through to the surface 11. Whereas the solid portion 14 will also increase the mass of the porous carbon material, the closed pores 13, which are voids, will not contribute to a mass increase even if the closed pores 13 increase. In order to enhance the charge-discharge capacity per unit volume, it is preferable that the closed pores 13 have a small volume ratio. As the volume ratio of the closed pores 13 increases, the granular volume of the negative-electrode active material, i.e., a total volume of the closed pores 13 and the solid portion 14, increases, whereby the apparent density (g/cc) decreases. Therefore, for the sake of obtaining a negative-electrode active material with a large capacity density per volume, it is preferable the solid portion 14 be large, more so than are the closed pore 13 that do not extend through to the surface 11. Particularly when the closed pores 13 account for a volume ratio of 10% or less of the total volume of the open pores 12, closed pores 13, and solid portion 14, it is possible to realize a negative-electrode active material for a sodium-ion secondary battery with a greater charge-discharge capacity per unit volume. Note that, when the volume ratio of the closed pores 13 decreases, the porous carbon material will increase in weight, so that the charge/discharge capacity per unit weight may decrease.

On the other hand, in a sodium-ion secondary battery, it is considered that the open pores 12 may directly come in contact with an anhydrous electrolytic solvent to allow solvated sodium ions to be occluded therein. However, when solvated sodium ions are occluded in the open pores 12, they may cause reduction of the solvent and electrolyte to trigger an irreversible reaction; thus, it is considered that irreversible occlusion and release of sodium is unlikely to occur in the open pores 12. For this reason, it is preferable that the open pores 12 are as few as possible; preferably, the open pores 12 account for a volume ratio of not less than 0% and not more than 50% with respect to the total volume of the open pores 12, closed pores 13, and solid portion 14. When the open pores 12 account for a volume ratio of 50% or less, it is possible to restrain any sodium that is conducive to irreversible capacity at initial charging and discharging; thus, a negative-electrode active material with a large charge/discharge capacity can be obtained. Especially when the open pores 12 account for a volume ratio of 20% or less, the irreversible capacity upon initial charging and discharging is further decreased; thus, a negative-electrode active material with a very large charge/discharge capacity can be provided.

According to a study by the inventors, regarding each open pore 12 and each closed pore 13 there is no particular limitation as to the interior size (the size of a cross section which is perpendicular to the direction that the pore extends) and length of the pore, so long as they are sized to allow insertion of sodium atoms, and it has not been found that the charge-discharge capacity is significantly affected by these. Sodium has an atomic radius of about 0.2 nm, and in view of the fact that Na ions that have been solvated by propylene carbonate have a diameter on the order of 0.4 nm (which is a calculation result by the Stokes method), it is considered that the open pores 12 and the closed pores 13 may advantageously have a cross-sectional size (diameter) of essentially 0.4 nm or more. Moreover, the diameters of helium, argon, and nitrogen are on the order of 0.3 to 0.4 nm, and as will be described below, the aforementioned volume ratio is defined by values that are obtained through a measurement using such gases. Therefore, it is considered that a circle inscribed in a cross section which is perpendicular to the longitudinal direction of each open pore 12 and each closed pore 13 is sized 0.4 nm or larger. On the other hand, when the open pores 12 and the closed pores 13 have cross sections which are larger than several nm, it becomes possible for plural sodium atoms to exist in a cross section of each closed pore 13. In actuality, however, it is considered that repulsion between sodium atoms, etc., makes it unlikely for sodium to be occluded in the closed pores 13 in such a manner that the sodium atoms exist in a cross section of each closed pore 13 with a high density. Therefore, in terms of effective space utility of the closed pores 13, it is considered preferable that a circle inscribed in a cross section which is perpendicular to the longitudinal direction of each closed pore 13 is sized essentially 100 nm or smaller. Also, use of the aforementioned gases will allow for precise measurement of the volume of pores with diameters which are essentially 100 nm or less.

Thus, in the negative-electrode active material for a sodium-ion secondary battery according to the present embodiment, in the carbon material composing at least a part of the solid portion 14 of the porous carbon material, the distance between (002) planes of the carbon backbone that is formed by $sp_2$ hybrid orbitals is 0.340 nm or more, whereby it can function well as occlusion and release sites of sodium ions. Moreover, occluded sodium is released in a reversible manner. Thus, a negative-electrode active material is realized which is capable of reversible occlusion and release of sodium. When the closed pores 13 account for a volume ratio of 10% or less and the open pores 12 account for a volume ratio of 50% or less, a negative-electrode active material is realized which provides a greater charge-discharge capacity per unit volume than conventional.

The distance between (002) planes in the porous carbon material that is contained in the negative-electrode active material for a sodium-ion secondary battery according to the present embodiment can be determined through X-ray diffractometry. A specific example of the measurental procedure will now be described in the order of sample adjustment, measurement, and analysis. During the sample adjustment, a porous carbon material is dried for 2 hours in a vacuum at 120° C., for example. Next, standard Si (NIST 640d) is weighed to 10 weight % with respect to the porous carbon material, and the dried porous carbon material and the standard Si are mixed in a mortar. Thus, a specimen for X-ray diffractometry is prepared. For the measurement, the Cu-Kα lines can be used as an X-ray source, for example. X rays are generated with an output power defined by a tube voltage of 40 kV and a tube current of 40 mA, and the specimen is scanned by a 2θ/θ method in a range from 20° to 30° (2θ), and diffraction lines are detected.

In the analysis, the measurement results are corrected according to a method which is described in JIS R7651 by using the peak position(s) of standard Si (111), and based on the resultant corrected value, the distance between (002) planes of the carbon backbone structure is determined by using Bragg's equation ($d_{002}=\lambda/\sin \theta_c/2$), from the carbon (002) peak value (2θ) which is observed near approximately 23° to 26°. In the case of the Cu-Kα lines, $\lambda=0.15419$ nm.

Depending on the porous carbon material, only a portion of the solid portion may become graphitized through a heat treatment, etc., which is conducted during production of the porous carbon material, whereby two or more (002) peaks of carbon may be observed near 23° to 26°. The sharp peak to be observed near 26° is a peak that is ascribable to the locally-graphitized solid portion, whereas the broad peak to be observed at the lowermost angle side is a peak that is ascribable to a solid portion of lower crystallinity. For a sodium pathway to function, it is preferable that the distance between (002) planes of the carbon backbone structure is 0.36 nm or more; as for any carbon material that exhibits two (002) peaks of carbon, the broad peak to be observed at the lower angle side may be regarded as the (002) peak of carbon, so that the distance between (002) planes can be determined from the peak value (2θ) thereof.

Moreover, in the carbon material contained in the negative-electrode active material for a sodium-ion secondary battery according to the present embodiment, a volume ratio of the closed pores (which hereinafter may simply be referred to as the closed pore ratio) can be determined as follows. First, the volume $V_{OP}$ (cc/g) of the open pores 12 per unit weight of the carbon material is determined through gas adsorption measurement. The volume of the solid portion 14 and the closed pores 13 of the porous carbon material can be determined as an inverse of an apparent density $d_{He}$ (g/cc) of the porous carbon material, through density measurement.

The volume ratio $R_{CP}$ (%) of the closed pores can be determined according to the following equation.

$$R_{CP} (\%)=(1/d_{He}-1/2.26)/(V_{OP}+1/d_{He})\times 100$$

Herein, the denominator of the above equation, i.e., ($V_{OP}+1/d_{He}$), is a sum volume of the open pores 12, closed pores 13, and solid portion 14 per gram of carbon material. The numerator ($1/d_{He}-1/2.26$), which is indicative of the volume of the closed pores 13, is a value resulting by subtracting the volume of the solid portion (1/2.26)) from the sum volume of the solid portion 14 and the closed pores 13 per gram of porous carbon material. By dividing the numerator with the denominator, and converting the resultant value into percentage, a volume ratio $R_{cp}$ (%) of the closed pores in the carbon material is obtained. The volume (1/2.26) of the solid portion 14 is calculated from the true density 2.26 g/cc of carbon.

An example of a specific measurement method of the volume ratio $R_{cp}$ (%) of the closed pores is as follows. For example, by using a carbon material which has been subjected to a pretreatment of being dried for 2 hours at 120° C. in a vacuum and using an argon or nitrogen gas as an adsorption gas species, the volume $V_{OP}$ (cc/g) of the open pores 12 per unit weight of the carbon material can be determined from an amount of adsorbed gas at a relative pressure 0.99 with an automatic gas adsorption quantifier. While the automatic gas adsorption quantifier is used as an apparatus for measuring the total pore volume (cc/g), gas will not be adsorbed to the closed pores in this measurement; therefore, it means that the volume $V_{OP}$ (cc/g) of the open pores 12 per unit weight is being measured.

By using a carbon material which has been subjected to a pretreatment of being dried for 2 hours at 120° C. in a vacuum and using helium as the measurement gas, an apparent density (g/cc) of the carbon material can be determined with an ultrapycnometer. Moreover, a volume ratio of the open pores in the carbon material (which hereinafter may simply be referred to as the open pore ratio) $R_{OP}$ can be calculated from the following equation, using $V_{OP}$ and $d_{He}$.

$$R_{OP} (\%)=V_{OP}/(V_{OP}+1/d_{He})\times 100$$

Moreover, the volume ratio of the open pore in the negative-electrode active material according to the present invention can be calculated according to the equation $100\times V_{OP}/(V_{OP}+1/d_{He})$ by using $V_{OP}$ and $d_{He}$ similar to the above.

The carbon material contained in the negative-electrode active material for a sodium-ion secondary battery according to the present embodiment can be obtained by baking an organic material or a porous carbon material to serve as a carbon source in an inert atmosphere, for example. As the carbon source, cellulose-type resins, phenol-type resins, phenolphthalein, and the like are preferable. The cellulose-type resin, phenol-type resins, and phenolphthalein may be indifferent as to their shapes, e.g., fibers, grains, etc., but in terms of processing to be performed for the active material grains after being baked, it is preferably of granular or linter shapes that are sized several μm to several dozen μm.

As inexpensive cellulose-type resins, charcoal, sawdust, paper, and the like are usable. The heat treatment temperature is preferably 1100° C. to 1300° C. Although there is no particular limitation to the baking atmosphere so long as it is inert, gases such as nitrogen, argon, helium, and neon are suitably used.

As the phenol-type resin, novolac resins, resol resins, and the like can be used. The heat treatment temperature is preferably 1000° C. to 1300° C. Although there is no particular limitation to the baking atmosphere so long as it is inert, gases such as nitrogen, argon, helium, and neon are suitably used.

The heat treatment temperature for phenolphthalein is preferably 1000° C. to 1300° C. Although there is no particular limitation to the baking atmosphere so long as it is inert, gases such as nitrogen, argon, helium, and neon are suitably used.

In the case where the porous carbon material needs to be pulverized for granulation or the like, it is preferable to pulverize the organic material or porous carbon material before being subjected to a heat treatment. When a porous carbon material which is obtained through a heat treatment is pulverized, the structure of the porous carbon material may possibly change, converting the closed pores into open pores.

Preferable porous carbon materials are activated carbon materials. The activated carbon material may be in fiber, grain, or other shapes. In terms of processing to be performed for the active material grains after being baked, it is desirably an activated carbon material of granular or linter shapes that are sized several μm to several dozen μm. As an inexpensive activated carbon material, steam activated carbon is usable. The heat treatment temperature is preferably not less than 1600° C. and not more than 2500° C. Although there is no particular limitation to the baking atmosphere so long as it is inert, gases such as nitrogen, argon, helium, and neon are suitably used.

(Embodiment 2)

Figure 2:
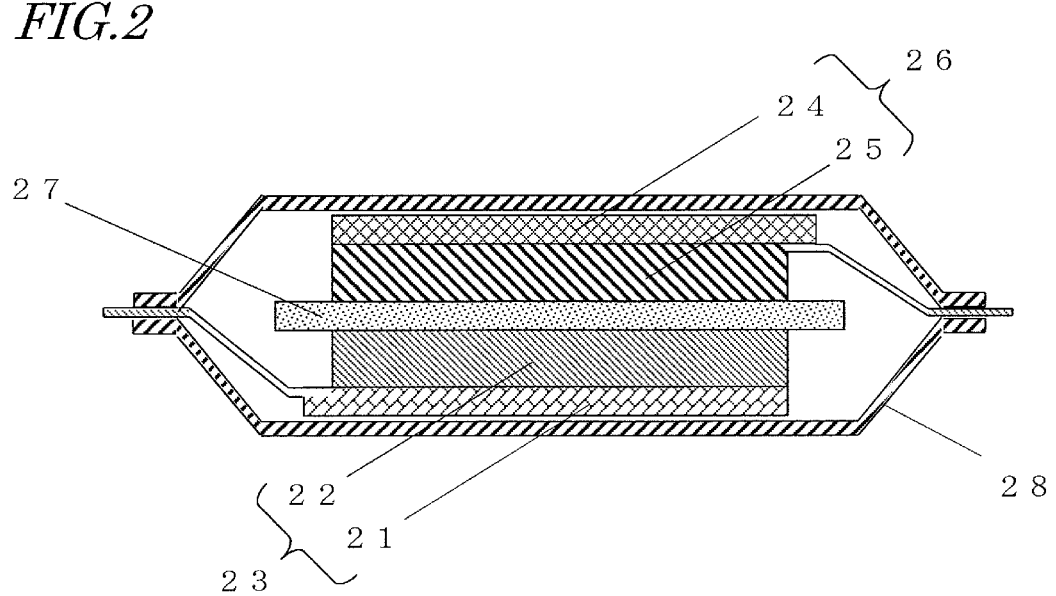
FIG. 2 A cross-sectional view showing a sodium-ion secondary battery according to an illustrative embodiment.

An embodiment of a sodium-ion secondary battery according to the present invention will be described. FIG. 2 is a schematic cross-sectional view illustrating a construction for a sodium-ion secondary battery of the present embodiment.

In the example shown in FIG. 2, the positive electrode 23 includes a positive-electrode current collector 21 and a positive-electrode mixture layer 22 formed on the positive-electrode current collector 21, the positive-electrode mixture layer 22 containing a positive-electrode active material. The negative electrode 26 includes a negative-electrode current collector 24 and a negative-electrode mixture layer 25 formed on the negative-electrode current collector 24, the negative-electrode mixture layer 25 containing a negative-electrode active material. The positive electrode 23 and the negative electrode 26 are disposed so that the positive-electrode mixture layer 22 and the negative-electrode mixture layer 25 oppose each other via the separator 27, thus constituting an electrode group. The electrode group is covered with a sheath 28.

The negative-electrode mixture layer 25 contains the negative-electrode active material for a sodium-ion secondary battery which has been described in Embodiment 1. As necessary, the negative-electrode mixture layer 25 may contain a conductivity aid, an ion conductor and/or a binder in addition to the negative-electrode active material. In the case where no conductivity aid, ion conductor, or binder is contained, the negative-electrode active material may be a thin film which is formed on the negative-electrode current collector 24.

As has been described in Embodiment 1, the negative-electrode active material contains a porous carbon material having open pores 12 that extend through to the surface, closed pores 13 that do not extend through to the surface, and a solid portion 14. In at least a part of the solid portion, the distance between (002) planes of the carbon is 0.340 nm or more. Moreover, the closed pores 13 account for a volume ratio of 10% less, and the open pores 12 account for a volume ratio of 50% or less. As will be seen from the Examples set forth below, a negative-electrode active material containing such a porous carbon material has a higher per unit weight volume than those of conventional negative-electrode active materials for a sodium-ion secondary battery. Therefore, according to the present embodiment, it is possible to realize a sodium-ion secondary battery which has a higher capacity per volume than conventional.

Furthermore, the negative electrode may be such that the distance between (002) planes of the solid portion 14 is 0.36 nm or more, or that the open pores 12 account for a volume ratio of 20% or less. Such an active material has a higher charge/discharge capacity density than those of conventional negative-electrode active materials for a sodium-ion secondary battery. Therefore, according to the present embodiment, a sodium-ion secondary battery with a higher capacity per volume than conventional can be realized.

The conductivity aid and the ion conductor are to be used in order to reduce electrode resistance. Examples of conductivity aids include: carbon materials such as carbon black, graphite, and acetylene black (carbon conductivity aid); and electrically-conductive polymer compounds such as polyaniline, polypyrrole, and polythiophene. Examples of ion conductors include: gel electrolytes such as polymethyl methacrylate and polymethyl methacrylate; and solid electrolytes such as polyethylene oxide.

The binder is to be used in order to improve the bindability of the material composing the electrode. Specific examples include polyvinylidene fluoride, vinylidene fluoride-hexafluoropropylene copolymers, vinylidene fluoride-tetrafluoroethylene copolymers, polytetrafluoroethylene, carboxymethyl cellulose, polyacrylic acid, styrene-butadiene rubber, polypropylene, polyethylene, and polyimide.

As the negative-electrode current collector 24, a porous or nonporous sheet or film which is made of a metal material, e.g., aluminum, stainless steel, nickel, copper, or an alloy thereof, can be used. Aluminum and alloys thereof provide the advantages of inexpensiveness and easiness of being formed into a thin film. As the sheet or film, a metal foil, a mesh, or the like is used. For the purposes of reducing the resistance value, providing a catalytic effect, and enhancing the bond between the negative-electrode mixture layer 25 and the negative-electrode current collector 24 through allowing the negative-electrode mixture layer 25 and the negative-electrode current collector 24 to be chemically or physically bonded, a carbon material such as carbon may be applied as a conductivity aid onto the surface of the negative-electrode current collector 24.

The positive-electrode mixture layer 22 contains a positive-electrode active material which is capable of occlusion and release of sodium ions. As necessary, the positive-electrode mixture layer 22 may contain a conductivity aid, an ion conductor and/or a binder in addition to the positive-electrode active material.

The positive-electrode active material is not particularly limited so long as it is a material which occludes and releases sodium ions, and may be, for example, sodium-containing transition metal oxides, transition-metal fluorides, polyanion and fluorinated polyanion materials, or transition-metal sulfides. Specifically, as a sodium-containing transition metal oxide, $Na_xMe^1_yO_2$ ($0<x\leq1$; $0.95\leq y<1.05$; $Me_1$ includes at least one selected from the group consisting of Fe, Mn, Ni, Co, Cr, and Ti) and the like can be used. As a transition-metal fluoride, $NaFeF_3$, $NaMnF_3$, $NaNiF_3$, and the like can be used. As polyanion or a fluorinated polyanion material, $NaMe^2PO_4$, $Na_3Me^2_2(PO_4)_3$, $Na_4Me^2_3(PO_4)_2P_2O_7$, $Na_2Me^2PO_4F$, $Na_3Me^2_2(PO_4)_2F_3$ (where $Me^2$ includes at least one selected from the group consisting of Fe, Mn, Ni, Co, Ti, V, and Mo), and the like can be used. As a transition-metal sulfide, $Ni_3S_2$, $FeS_2$, $TiS_2$, and the like can be used. Among others, use of a Na-containing transition metal oxide provides the advantage of low production cost and high average discharge voltage. As for the conductivity aid, ion conductor, and binder, what is similar to those for the negative-electrode mixture layer 15 can be used.

As the positive-electrode current collector 21, a porous or nonporous sheet or film which is made of a metal material, e.g., aluminum, stainless steel, titanium, or an alloy thereof, can be used. Aluminum and alloys thereof provide the advantages of inexpensiveness and easiness of being formed into a thin film, and so on. As the sheet or film, a metal foil, a mesh, or the like is used. For the purposes of reducing the resistance value, providing a catalytic effect, and enhancing the bond between the positive-electrode mixture layer 22 and the positive-electrode current collector 21 through allowing the positive-electrode mixture layer 22 and the positive-electrode current collector 21 to be chemically or physically bonded, a carbon material such as carbon may be applied as a conductivity aid onto the surface of the positive-electrode current collector 21.

As the separator 27, a porous film of polyethylene, polypropylene, glass, cellulose, ceramics, or the like is used, as being impregnated with an electrolyte in its pores.

Examples of anhydrous electrolytes to be used for a battery include an anhydrous solvent, a gel electrolyte, or a solid electrolyte containing a sodium salt.

As species of the sodium salt, sodium phosphate hexafluoride ($NaPF_6$), sodium borate tetrafluoride ($NaBF_4$), sodium perchlorate ($NaClO_4$), sodium bis(trifluoromethyl-sulfonyl)imide ($NaN(SO_2CF_3)_2$), sodium bis(perfluoroeth-ylsulfonyl)imide ($NaN(SO_2C_2F_5)_2$), sodium bis(fluorom-ethylsulfonyl)imide ($NaN(SO_2F)_2$), $NaAsF_6$, $NaCF_3SO_3$, sodium difluoro(oxalato)borate, and the like can be used. From the standpoints of safety, thermostability, and ion conductivity of the battery, $NaPF_6$ is suitably used. It is applicable to use one of the aforementioned electrolyte salts, or two or more of them in combination.

Examples of anhydrous solvents include cyclic carbonic acid esters, acyclic carbonic acid esters, esters, cyclic ethers, acyclic ethers, nitriles, and amides for use as anhydrous solvents for usual batteries. It is applicable to use one of these solvents alone, or two or more of them in combination.

Examples of cyclic carbonic acid esters include ethylene carbonate, propylene carbonate, and butylene carbonate; some or all hydrogen groups therein may be fluorinated, e.g., trifluoropropylene carbonate or fluoroethyl carbonate.

Examples of acyclic carbonic acid esters include dimethyl carbonate, ethylmethyl carbonate, diethyl carbonate, methylpropyl carbonate, and ethylpropyl carbonate, methylisopropyl carbonate. Some or all hydrogen groups therein may be fluorinated.

Examples of esters include methyl acetate, ethyl acetate, propyl acetate, methyl propionate, ethyl propionate, and γ-butyrolactone. Examples of cyclic ethers include 1,3-dioxolane, 4-methyl-1,3-dioxolane, tetrahydrofuran, 2-methyltetrahydrofuran, propyleneoxide, 1,2-butylene oxide, 1,4-dioxane, 1,3,5-trioxane, furan, 2-methylfuran, 1,8-cineole, and crown ether.

Examples of acyclic ethers include 1,2-dimethoxy ethane, diethyl ether, dipropyl ether, diisopropyl ether, dibutyl ether, dihexyl ether, ethylvinyl ether, butylvinyl ether, methylphenyl ether, ethylphenyl ether, butylphenyl ether, pentylphenyl ether, methoxy toluene, benzylethyl ether, diphenyl ether, dibenzyl ether, o-dimethoxy benzene, 1,2-diethoxy ethane, 1,2-dibutoxy ethane, diethyleneglycol dimethylether, diethyleneglycol diethylether, diethyleneglycol dibutyl ether, 1,1-dimethoxy methane, 1,1-diethoxy ethane, triethylene glycol dimethyl ether, and tetraethylene glycol dimethyl ether.

Examples of nitriles include acetonitrile. Examples of amides include dimethylformamide.

EXAMPLES AND COMPARATIVE EXAMPLES

As Examples and Comparative Examples, evaluation cells of negative-electrode active materials for a sodium-ion battery were produced in which the negative-electrode active material was used as a test electrode and a sodium metal was used as a counter electrode, and these were subjected to evaluations; hereinafter, the methods and results thereof will be described. Note that embodiments of the present invention are not limited to the Examples described below.

1. Production of Cell

Example 1

Production of the Negative-electrode Active Material

A carbon material to become the negative-electrode active material was produced through the three steps of a carbonization step, a classification step, and a heat treatment step as below.

First, the carbonization step is described. α-cellulose (quantitative filter paper manufactured by Whatman (No. 40)) was used as a carbon source, which was heated at a rate of 10° C. per minute up from room temperature in a tube furnace (Ar gas flow rate: 1 L/min) under an Ar atmosphere, until reaching 1000° C., and then maintained at 1000° C. for 1 hour. Thereafter, heating was stopped, and after natural cooling, a carbide was taken out of the tube furnace.

Next, the classification step is described. The carbide obtained through the above carbonization step was pulverized in an agate mortar, and classified by using a standard sieve of SUS with an opening of 40 μm, whereby carbon powder was obtained.

Lastly, the heat treatment step is described. The above carbon powder was heated at a rate of 10° C. per minute up from room temperature in a circular furnace under an Ar atmosphere (Ar gas flow rate: 1 L/min), until reaching 1200° C., and then maintained at 1200° C. for 1 hour. Thereafter, heating was stopped, and after natural cooling, a carbon material was taken out of the tube furnace, whereby a negative-electrode active material made of a porous carbon material was obtained.

Production of the Sodium-ion Secondary Battery

By using the carbon material produced by the above method as a negative-electrode active material, and using a copper foil as a current collector, a test electrode was produced. The above porous carbon material as the negative-electrode active material and polyvinylidene fluoride as a binder were weighed to a ratio by weight of 9:1, and dispersed in an NMP solvent to obtain a slurry. By using a coater, a copper foil was coated with the resultant slurry. The coated plate was rolled with a roller, punched into a square shape with each side measuring 20 mm, and processed into an electrode shape, thus obtaining a test electrode.

Then, using the above test electrode, a sodium-ion secondary battery (evaluation cell) having a counter electrode of a sodium metal was produced.

Blending of the electrolytic solution and production of the evaluation cell were conducted in a glove box under an Ar atmosphere with a dew point of −60 degrees or below and an oxygen value of 1 ppm or less. The electrolytic solution contained 1 molarity of sodium phosphate hexafluoride ($NaPF_6$) being dissolved in a solvent in which ethylene carbonate and diethyl carbonate were mixed at a volume ratio of 1:1. Moreover, a piece of sodium metal was crimped onto a nickel mesh having a square shape with each side measuring 20 mm, thus obtaining a counter electrode.

The above test electrode and counter electrode were housed in a sheath so that they opposed each other via a separator of a polyethylene microporous film impregnated with the electrolytic solution, and the sheath was sealed, thus obtaining an evaluation cell.

Example 2

Except for a different carbon source and a different temperature of the heat treatment step for the carbon material, otherwise the same method as that of Example 1 was used to produce a negative-electrode active material, and an evaluation cell was produced by the same method as that of Example 1. A novolac resin was used as the carbon source, and the heat treatment temperature was 1000° C.

Example 3

Except for a different temperature of the heat treatment step for the carbon material, otherwise the same method as that of Example 2 was used to produce a negative-electrode active material, and an evaluation cell was produced by the same method as that of Example 2. The heat treatment temperature was 1200° C.

Example 4

Except for a different carbon source and a different temperature of the heat treatment step for the carbon material, otherwise the same method as that of Example 1 was used to produce a negative-electrode active material, and an evaluation cell was produced by the same method as that of Example 1. An activated carbon material (specific surface: 2600 m$^2$/g; average grain size: 5 μm) was used as the carbon source, and the heat treatment temperature was 2100° C.

Example 5

Except for a different temperature of the heat treatment step for the carbon material, otherwise the same method as that of Example 4 was used to produce a negative-electrode active material, and an evaluation cell was produced by the same method as that of Example 4. The heat treatment temperature was 2400° C.

Example 6

Except for a different carbon source and a different temperature of the heat treatment step for the carbon material, otherwise the same method as that of Example 1 was used to produce a negative-electrode active material, and an evaluation cell was produced by the same method as that of Example 1. Phenolphthalein was used as the carbon source, and the heat treatment temperature was 1000° C.

Example 7

Except for a different temperature of the heat treatment step for the carbon material, otherwise the same method as that of Example 6 was used to produce a negative-electrode active material, and an evaluation cell was produced by the same method as that of Example 6. The heat treatment temperature was 1200° C.

Comparative Example 1

Except for a different temperature of the heat treatment step for the carbon material, otherwise the same method as that of Example 1 was used to produce a negative-electrode active material, and an evaluation cell was produced by the same method as that of Example 1. The heat treatment temperature was 1000° C.

Comparative Example 2

Except that a hard carbon carbon material (Carbotron P manufactured by Kureha Battery Materials Japan Co., Ltd.) was used as the negative-electrode active material, otherwise the same method as that of Example 1 was used to produce an evaluation cell.

Comparative Example 3

Except for a different temperature of the heat treatment step for the carbon material, otherwise the same method as that of Example 1 was used to produce a negative-electrode active material, and an evaluation cell was produced by the same method as that of Example 1. The heat treatment temperature was 1800° C.

Comparative Example 4

Except that a graphite-type carbon material (NG12 manufactured by KANSAI COKE AND CHEMICALS Co., Ltd.) was used as the negative-electrode active material, otherwise the same method as that of Example 1 was used to produce an evaluation cell.

Comparative Example 5

Except for a different temperature of the heat treatment step for the carbon material, otherwise the same method as that of Example 2 was used to produce a negative-electrode active material, and an evaluation cell was produced by the same method as that of Example 2. The heat treatment temperature was 1500° C.

Comparative Example 6

Except for a different temperature of the heat treatment step for the carbon material, otherwise the same method as that of Example 4 was used to produce a negative-electrode active material, and an evaluation cell was produced by the same method as that of Example 4. The heat treatment temperature was 1500° C.

Comparative Example 7

Except for a different temperature of the heat treatment step for the carbon material, otherwise the same method as that of Example 6 was used to produce a negative-electrode active material, and an evaluation cell was produced by the same method as that of Example 6. The heat treatment temperature was 1400° C.

2. Characteristics Evaluation (A) Measurement of the Open Pore Ratio, the Closed Pore Ratio, and the Interlayer Distance of the Porous Carbon Material The open pore ratio, the closed pore ratio, and the interlayer distance of the porous carbon materials of Examples 1 to 7 and Comparative Examples 1 to 7 were measured. The open pore ratio and the closed pore ratio were measured through the following procedure.

With an automatic gas adsorption quantifier (AS1-MP-9 manufactured by Quantachrome Instruments), a gas adsorption measurement for the porous carbon material was carried out by using argon, and a total pore volume $V_{OP}$ (cc/g) of the porous carbon material was determined from the amount of adsorbed gas at a relative pressure of 0.99.

With an ultrapycnometer (Ultrapic1200e manufactured by Quantachrome Instruments), an apparent density $d_{He}$ of the porous carbon material was determined by using helium as a measurement gas.

Moreover, from the $V_{OP}$ and $d_{He}$ as determined from the results of the gas adsorption measurement and density measurement, a ratio between the open pore ratio and the closed pore of the negative-electrode active material was determined according to the following equation.

closed pore ratio $R_{CP}$ (%)=100×(1/$d_{He}$−1/2.26)/($V_{OP}$+1/$d_{He}$)

open pore ratio $R_{OP}$ (%)=100×$V_{OP}$/($V_{OP}$+1/$d_{He}$)

The interlayer distance of the porous carbon material was measured by the following procedure. Ten mass % of standard Si (NIST 640d) with respect to the porous carbon material was taken, and sufficiently mixed in a mortar, which served as a specimen for X-ray diffractometry. As an X-ray diffractometry apparatus, RINT2000 manufactured by Rigaku Corporation was used. As the X-ray source, the Cu-Kα lines were used, and measurements were taken through scanning across 20° to 30° (2θ) by the 2θ/θ method, with a measurement output defined by a tube voltage of 40 kV and a tube current of 40 mA. A carbon (002) peak near 23° to 26° was corrected with a peak position of standard Si (111), and a distance between (002) planes of the solid portion was determined from Bragg's equation (d=λ/sin θ$_c$/2).

(B) Method of the Charge-discharge Test for the Negative-electrode Active Material The evaluation cells of Examples 1 to 7 and Comparative Examples 1 to 7 were subjected to a charge-discharge test to evaluate their charge-discharge characteristics. The method and results will be described.

The charge-discharge test for the evaluation cells was conducted in a thermostatic bath at 25° C. In the charge-discharge test, the test electrode containing the negative-electrode active material was charged, and after a pause of 20 minutes, it was discharged. The charging and discharging were performed with a constant current, with a current value corresponding to 0.05 mA per unit area of the negative electrode. The end of charge was defined as a point in time at which the voltage reached 0 V (charge end voltage: 0 V). The end of discharge was defined as a point in time at which the voltage reached 2.0 V (discharge end voltage: 2.0 V). An initial discharge capacity density per weight (mAh/g) was calculated as a value of the initial discharge capacity as divided per weight of the negative-electrode active material, and an initial discharge capacity density per volume (mAh/cc) was calculated as a value resulting from dividing the initial discharge capacity with the initial charge capacity.

The results of the charge-discharge test of the evaluation cells of Examples 1 to 7 and Comparative Examples 1 to 7 are shown in Table 1, together with the closed pore ratio, the open pore ratio, and the inter-plane distance of the negative-electrode active material.

TABLE 1

| | carbon material structure | | | charge-discharge test | |
| | inter-plane distance | closed pore ratio | open pore ratio | initial discharge capacity density | |
| | nm | % | % | mAh/g | mAh/cc |
| Example 1 | 0.385 | 8.5 | 6.6 | 266 | 546 |
| Example 2 | 0.389 | 9.6 | 18.0 | 259 | 522 |
| Example 3 | 0.386 | 8.0 | 2.3 | 269 | 568 |
| Example 4 | 0.362 | 9.1 | 47.4 | 221 | 462 |
| Example 5 | 0.360 | 6.1 | 22.7 | 254 | 481 |
| Example 6 | 0.386 | 9.5 | 26.0 | 249 | 491 |
| Example 7 | 0.383 | 8.0 | 2.3 | 262 | 544 |
| Comparative Example 1 | 0.388 | 6.4 | 51.3 | 175 | 343 |
| Comparative Example 2 | 0.379 | 11.0 | 2.4 | 223 | 448 |
| Comparative Example 3 | 0.363 | 35.9 | 4.1 | 250 | 361 |
| Comparative Example 4 | 0.335 | 8.4 | 2.3 | 1 | 2 |
| Comparative Example 5 | 0.379 | 27.2 | 11.0 | 259 | 416 |
| Comparative Example 6 | 0.370 | 0.8 | 72.5 | 102 | 215 |
| Comparative Example 7 | 0.382 | 30.8 | 1.4 | 266 | 420 |

3. Discussion

In all of Examples 1 to 7 and Comparative Examples 1 to 7, a porous carbon material is used as the negative-electrode active material. However, the results shown in Table 1 indicate that these negative-electrode active materials greatly differ in their discharge capacity density depending on the structure of the porous carbon material.

Firstly, Comparative Example 4 resulted in a considerably lower initial discharge capacity density, as compared to Examples 1 to 7, Comparative Examples 1 to 3, and Comparative Examples 5 to 7. This is presumably because the solid portion has a distance between (002) planes which is as small as 0.335 nm, and thus do not function well as a pathway of sodium ions and occlusion and release sites of sodium ions. Therefore, it is preferable that the distance between (002) planes of the solid portion is greater than 0.335 nm, and is equal to or greater than 0.340 nm, which is the distance between (002) planes of standard carbon materials. Furthermore, in Comparative Examples 1 to 3 and Comparative Examples 5 to 7, higher initial discharge capacity densities than that of Comparative Example 4 are obtained, which makes it presumable that the solid portion is functioning as a pathway of sodium ions and occlusion and release sites of sodium ions. Therefore, the distance between (002) planes of the solid portion is preferably 0.360 nm or more.

Next, between the negative-electrode active materials of Example 7 and Comparative Example 7, they exhibited similar discharge capacity density values per weight, but resulted in greatly different discharge capacity densities per volume.

In the negative-electrode active material of Example 7, the solid portion had a distance between (002) planes of 0.383 nm, thus functioning well as a pathway of sodium ions and occlusion and release sites of sodium ions, and exhibited a discharge capacity per volume as large as 544 mAh/cc. However, in the negative-electrode active material of Comparative Example 7, the solid portion had an essentially similar distance between (002) planes of 0.382 nm, but exhibited a discharge capacity per volume as small as 420 mAh/cc. The presumable reason for this result is that, since the closed pore account for a volume ratio as large as 30.8% in the negative-electrode active material of Comparative Example 7, the apparent density of the negative-electrode active material has decreased, thus resulting in the discharge capacity density small per volume, in spite of its similar discharge capacity density per weight. It is learned from these results that the discharge capacity per unit volume can be increased when the distance between (002) planes of the solid portion is 0.340 nm or more and the closed pore account for a volume ratio of 10% or less.

Figure 3:
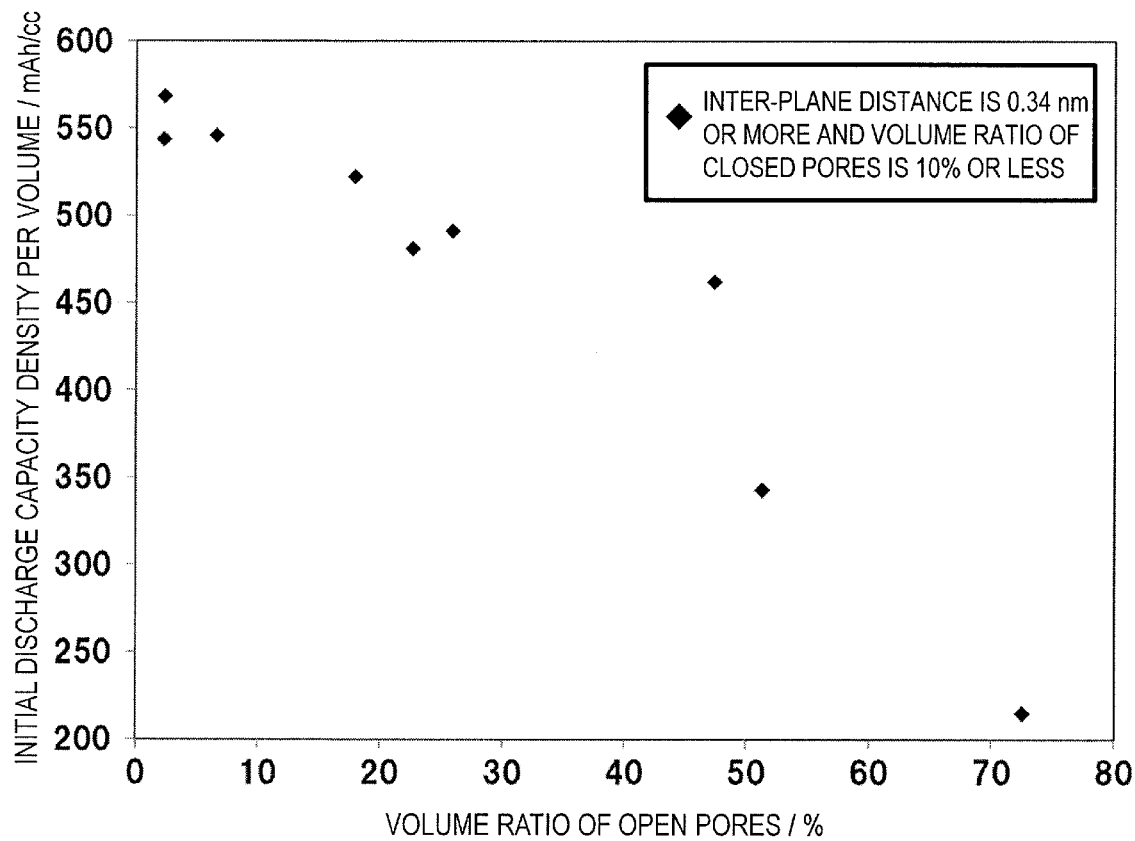
FIG. 3 A graph showing a relationship between the initial discharge capacities per volume of sodium-ion secondary batteries of Examples 1 to 7, Comparative Example 1, Comparative Example 6, and Comparative Example 11 and the open pore ratio of the negative-electrode active material.

FIG. 3 shows a relationship between the initial discharge capacity density per volume in the charge-discharge test and the volume ratio of open pores of the negative-electrode active material, with respect to the evaluation cells of Examples 1 to 7 and Comparative Example 1 and Comparative Example 6, in which the solid portion has a distance between (002) planes of 0.340 nm or more and the closed pores account for a volume ratio of 10% or less. In all of the negative-electrode active materials of Examples 1 to 7, the distance between (002) planes of the solid portion is 0.340 nm or more, and the closed pores account for a volume ratio of 10% or less and the open pores account for a volume ratio of 50% or less. Moreover, they exhibit initial discharge capacities per unit volume of 448 mAh/cc or more. It is learned from these results that, when the solid portion has a distance between (002) planes of 0.340 nm or more, and the closed pores account for a volume ratio of 10% or less and the open pores account for a volume ratio of 50% or less, a high capacity exceeding those of conventional hard carbon carbon materials is obtained. Furthermore, Examples 1 to 3 and Example 7 exhibited higher discharge capacity densities per volume than those of Examples 4 to 6. This is presumably because the smaller volume ratio of the open pores has led to a decrease in the irreversible reaction occurring at the open pore surface. Thus, it can be seen that the open pores preferably account for a volume ratio of 20% or less.

In the negative-electrode active materials of Comparative Example 1 and Comparative Example 6, the distance between (002) planes of the solid portion is sufficiently large, i.e., 0.388 nm and 0.370 nm, and the closed pore ratio is as small as 6.4% and 0.8%. Therefore, sufficient occlusion sites for sodium ions can be secured and the apparent density is large, but the open pore ratio being as large as 51.3% and 72.5% has led to more irreversible reactions occurring at the open pore surface, thus resulting in the small initial discharge capacity densities per volume of 343 mAh/cc and 215 mAh/cc.

In the negative-electrode active materials of Comparative Example 2, Comparative Example 3, and Comparative Example 5, the distance between (002) planes of the solid portion is sufficiently large, i.e., 0.379 nm, 0.363, and 0.379 nm, and the open pore ratio is as small as 2.4%, 4.1%, and 11.0. Therefore, sufficient occlude sites for sodium ions can be secured and the irreversible reaction occurring at the open pore surface is suppressed, but the closed pore ratio being as large as 11.0%, 35.9%, and 27.2% has led to small apparent densities, resulting in the small initial discharge capacity densities of 448 mAh/cc, 361 mAh/cc, and 416 mAh/cc.

From the above results, it was confirmed that a porous carbon material having open pores that extend through to the surface, closed pores that do not extend through to the surface, and a solid portion, such that the porous carbon material contains a solid portion in which the distance between (002) planes of the solid portion is greater than 0.334 nm, and the closed pores account for a volume ratio of 10% or less and the open pores account for a volume ratio of 50% or less has a discharge capacity density per volume of 448 mAh/cc or more, which is large for a negative-electrode active material for a sodium-ion secondary battery.

It is also indicative that a sodium-ion secondary battery in which such a negative-electrode active material with large discharge capacity density per volume is used can provide a storage battery which has a large capacity density per volume, i.e., compact.

The above embodiments illustrate negative-electrode active materials which at least partially have open pores or closed pores. However, it is preferable that the volume ratio of open pores or closed pores is as small as possible; it is not intended that negative-electrode active materials having neither no open pores or closed pores are excluded. It is considered that a negative-electrode active material having no open pores or closed pores can be realized by appropriately selecting heat treatment conditions, for example.

INDUSTRIAL APPLICABILITY

A sodium-ion secondary battery according to one implementation of the present invention can be suitably used for a power source of a mobile electronic device or the like; a power storage device for electric power leveling to be used in combination with power generation equipment for thermal power generation, aerogeneration, fuel cell generation, or the like; a power source of an emergency power storage system, a late-night power storage system, or the like for general households and collective housing; an uninterruptible power supply; and a power source of a transportation apparatus such as an electric vehicle, a hybrid vehicle, or a plug-in hybrid vehicle.

REFERENCE SIGNS LIST 10 negative-electrode active material
11 surface
12 open pore
13 closed pore
14 solid portion
15 negative-electrode mixture layer
21 positive-electrode current collector
22 positive-electrode mixture layer
23 positive electrode
24 negative-electrode current collector
25 negative-electrode mixture layer
26 negative electrode
27 separator
28 sheath

The invention claimed is:

1. A negative-electrode active material for a sodium-ion secondary battery, comprising a porous carbon material having a plurality of open pores that extend through to a surface, a plurality of closed pores that do not extend through to the surface, and a solid portion made of carbon material, wherein, a distance between (002) planes of the solid portion is not less than 0.340 nm and not more than 0.410 nm;

the plurality of closed pores account for a volume ratio of not less than 0% and not more than 10% with respect to a total volume of the plurality of open pores, the plurality of closed pores, and the solid portion; and the plurality of open pores account for a volume ratio of not less than 0% and not more than 50% with respect to a total volume of the plurality of open pores, the plurality of closed pores, and the solid portion.

2. The negative-electrode active material for a sodium-ion secondary battery of claim 1, wherein a distance between (002) planes of the solid portion is 0.36 nm or more.

3. The negative-electrode active material for a sodium-ion secondary battery of claim 1, wherein the plurality of open pores account for a volume ratio of 20% or less with respect to a total volume of the plurality of open pores, the plurality of closed pores, and the solid portion.

4. A sodium-ion secondary battery comprising:
  a negative electrode containing the negative-electrode active material of claim 1;
  a positive electrode containing a positive-electrode active material capable of occlusion and release of sodium ions; and
  an electrolyte containing sodium ions.

5. A method of producing a negative-electrode active material for a sodium-ion secondary battery, comprising:
  a step of providing an activated carbon material; and
  a step of subjecting the activated carbon material to a heat treatment in an inert atmosphere to obtain a porous carbon material, wherein,
  the porous carbon material has a plurality of open pores that extend through to a surface, a plurality of closed pores that do not extend through to the surface, and a solid portion made of carbon material;
  a distance between (002) planes of carbon in at least a part of the solid portion is not less than 0.340 nm and not more than 0.410 nm;
  the plurality of closed pores account for a volume ratio of not less than 0% and not more than 10% with respect to a total volume of the plurality of open pores, the plurality of closed pores, and the solid portion; and
  the plurality of open pores account for a volume ratio of not less than 0% and not more than 50% with respect to a total volume of the plurality of open pores, the plurality of closed pores, and the solid portion.

6. The method of producing a negative-electrode active material for a sodium-ion secondary battery of claim 5, wherein the heat treatment temperature is not less than 1600° C. and not more than 2500° C.

7. A method of producing a negative-electrode active material for a sodium-ion secondary battery, comprising:
  a step of providing an organic material to serve as a carbon source; and
  a step of subjecting the organic material to a heat treatment in an inert atmosphere to obtain a porous carbon material, wherein,
  the organic material is a cellulose-type resin;
  the porous carbon material is not subjected to a pulverization treatment after being subjected to the heat treatment;
  the porous carbon material has a plurality of open pores that extend through to a surface, a plurality of closed pores that do not extend through to the surface, and a solid portion made of carbon material;
  a distance between (002) planes of carbon in at least a part of the solid portion is not less than 0.340 nm and not more than 0.410 nm;
  the plurality of closed pores account for a volume ratio of not less than 0% and not more than 10% with respect to a total volume of the plurality of open pores, the plurality of closed pores, and the solid portion; and
  the plurality of open pores account for a volume ratio of not less than 0% and not more than 50% with respect to a total volume of the plurality of open pores, the plurality of closed pores, and the solid portion.

8. The method of producing the negative-electrode active material for a sodium-ion secondary battery of claim 7, wherein the heat treatment temperature is not less than 1100° C. and not more than 1300° C.

9. The method of producing a negative-electrode active material for a sodium-ion secondary battery of claim 7, further comprising, before the step of subjecting the organic material to the heat treatment:
  a step of carbonizing the organic material to obtain a carbide; and
  a step of pulverizing the carbide, wherein
  in the step of subjecting the organic material to the heat treatment, the pulverized carbide is heat-treated.

10. A method of producing a negative-electrode active material for a sodium-ion secondary battery, comprising:
  a step of providing an organic material to serve as a carbon source; and
  a step of subjecting the organic material to a heat treatment in an inert atmosphere to obtain a porous carbon material, wherein,
  the organic material is a phenol-type resin;
  the porous carbon material is not subjected to a pulverization treatment after being subjected to the heat treatment;
  the porous carbon material has a plurality of open pores that extend through to a surface, a plurality of closed pores that do not extend through to the surface, and a solid portion made of carbon material;
  a distance between (002) planes of carbon in at least a part of the solid portion is not less than 0.340 nm and not more than 0.410 nm;
  the plurality of closed pores account for a volume ratio of not less than 0% and not more than 10% with respect to a total volume of the plurality of open pores, the plurality of closed pores, and the solid portion; and
  the plurality of open pores account for a volume ratio of not less than 0% and not more than 50% with respect to a total volume of the plurality of open pores, the plurality of closed pores, and the solid portion.

11. The method of producing a negative-electrode active material for a sodium-ion secondary battery of claim 10, wherein the heat treatment temperature is not less than 1000° C. and not more than 1300° C.

12. The method of producing a negative-electrode active material for a sodium-ion secondary battery of claim 10, further comprising, before the step of subjecting the organic material to the heat treatment:
  a step of carbonizing the organic material to obtain a carbide; and
  a step of pulverizing the carbide, wherein
  in the step of subjecting the organic material to the heat treatment, the pulverized carbide is heat-treated.

13. A method of producing a negative-electrode active material for a sodium-ion secondary battery, comprising:
  a step of providing an organic material to serve as a carbon source; and
  a step of subjecting the organic material to a heat treatment in an inert atmosphere to obtain a porous carbon material, wherein,
  the organic material is a phenolphthalein;
  the heat treatment temperature is not less than 1000° C. and not more than 1300° C.;
  the porous carbon material is not subjected to a pulverization treatment after being subjected to the heat treatment;
  the porous carbon material has a plurality of open pores that extend through to a surface, a plurality of closed pores that do not extend through to the surface, and a solid portion made of carbon material;

a distance between (002) planes of carbon in at least a part of the solid portion is not less than 0.340 nm and not more than 0.410 nm;

the plurality of closed pores account for a volume ratio of not less than 0% and not more than 10% with respect to a total volume of the plurality of open pores, the plurality of closed pores, and the solid portion; and the plurality of open pores account for a volume ratio of not less than 0% and not more than 50% with respect to a total volume of the plurality of open pores, the plurality of closed pores, and the solid portion.

14. The method of producing a negative-electrode active material for a sodium-ion secondary battery of claim 13, further comprising, before the step of subjecting the organic material to the heat treatment:

a step of carbonizing the organic material to obtain a carbide; and a step of pulverizing the carbide, wherein in the step of subjecting the organic material to the heat treatment, the pulverized carbide is heat-treated.

* * * * *